(No Model.) 3 Sheets—Sheet 2.
J. B. FORSYTH.
SAFETY STOP DEVICE FOR GRINDERS, &c.
No. 570,848. Patented Nov. 3, 1896.
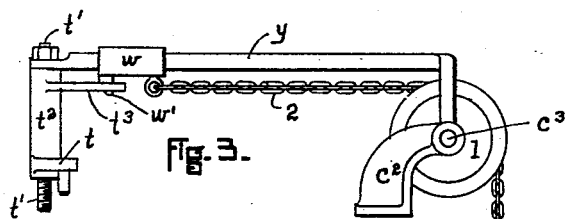
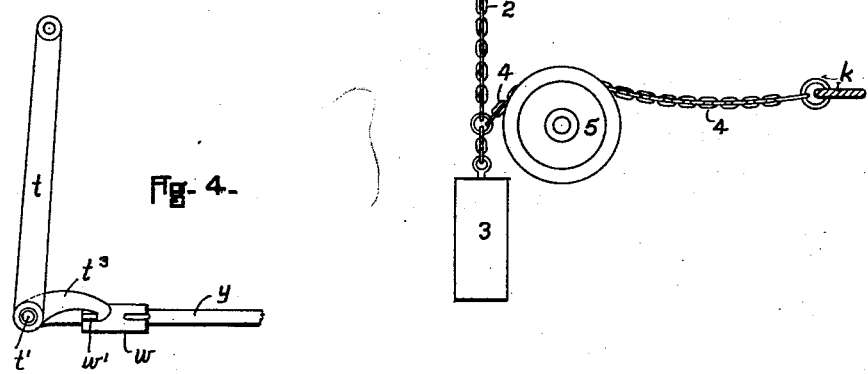
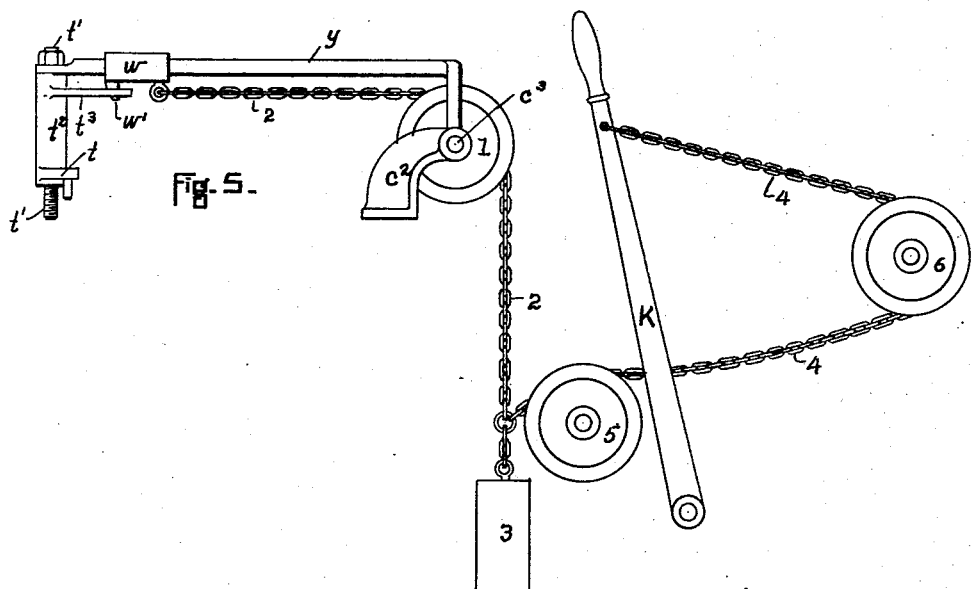

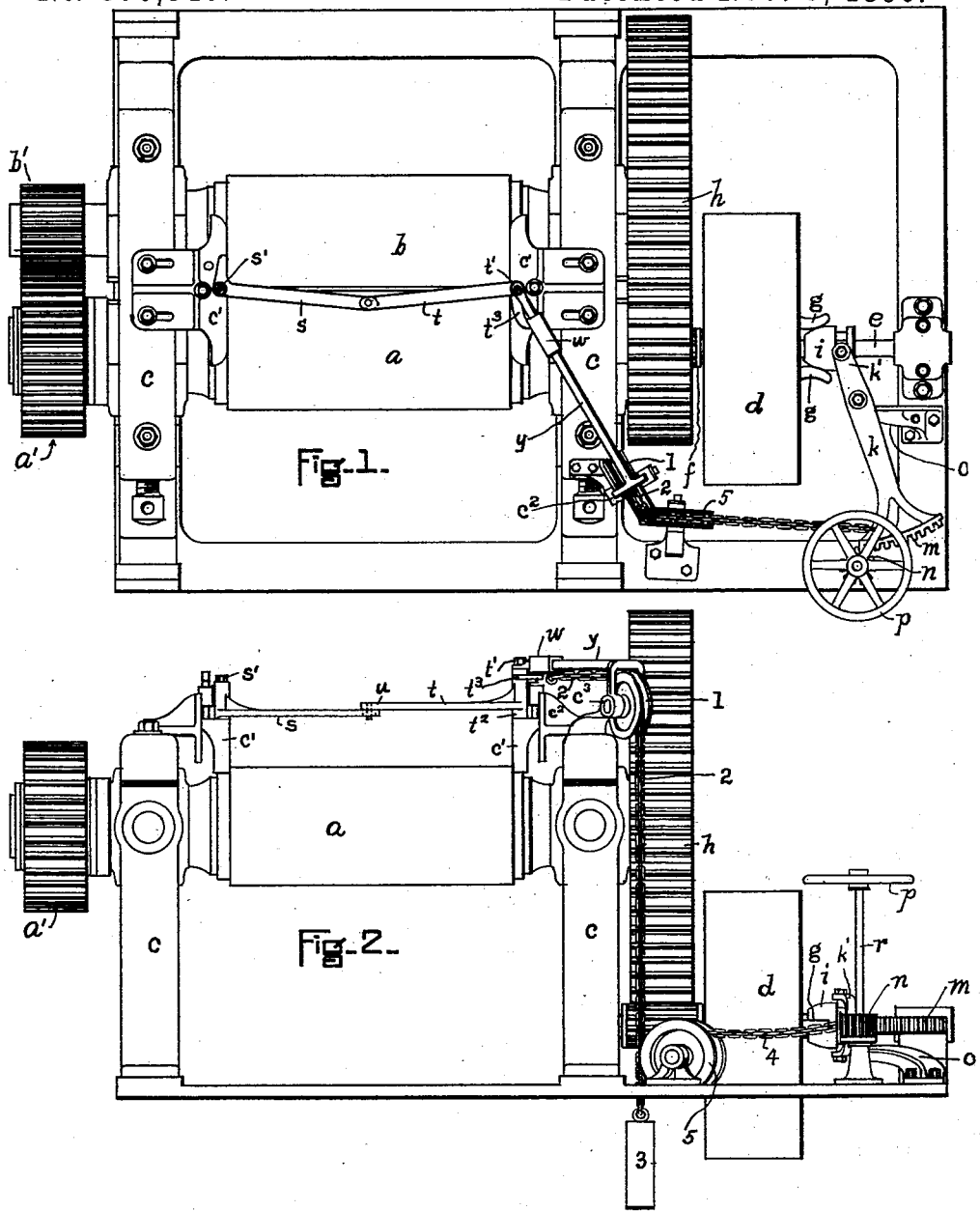

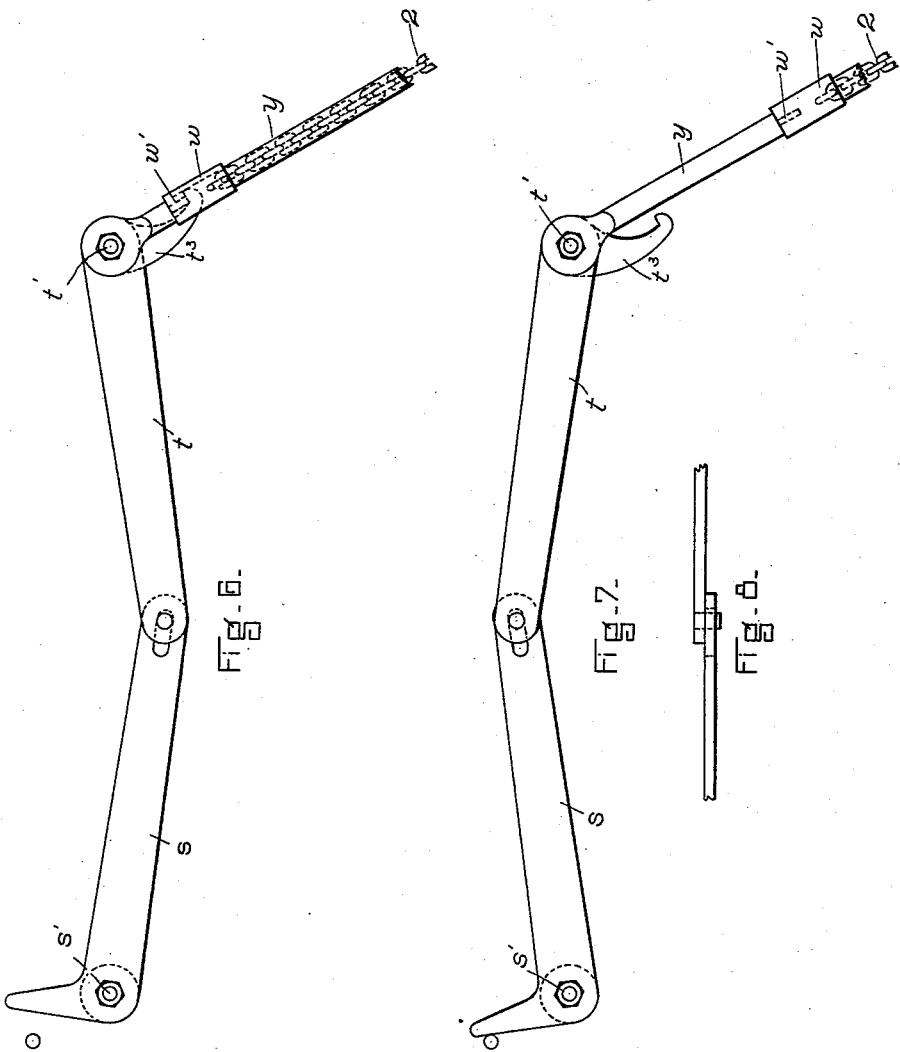

UNITED STATES PATENT OFFICE.

JAMES BENNETT FORSYTH, OF BOSTON, MASSACHUSETTS.

SAFETY STOP DEVICE FOR GRINDERS, &c.

SPECIFICATION forming part of Letters Patent No. 570,848, dated November 3, 1896.

Application filed February 1, 1896. Serial No. 577,721. (No model.)

*To all whom it may concern:*

Be it known that I, JAMES BENNETT FORSYTH, a citizen of the United States, residing at Boston, in the county of Suffolk and State of Massachusetts, have invented certain new and useful Improvements in Safety Stop Devices for Grinding-Rolls, Calenders, and other Similar Machines, of which the following, together with the accompanying drawings, having reference letters and figures herein referred to, is a full and exact description.

With reference to the drawings, Figure 1 is a plan of a grinder having but two rolls such as are employed in the manufacture of rubber goods and having my stop device attached. Fig. 2 is a side elevation of the machine shown in Fig. 1. Fig. 3 is a diagrammatic view of my safety stop mechanism. Fig. 4 is an inverted plan of certain details of the device. Fig. 5 is another diagrammatic view of the stop mechanism, showing its application to a different style of shipping-lever. Figs. 6, 7, and 8 illustrate details.

The grinder, as shown in Figs. 1 and 2, is composed of a pair of heavy rolls $a$ and $b$, mounted in bearings in a suitable framework $c$, and geared together by gears $a'$ and $b'$ and driven by a belt (not shown) on friction clutch-pulley $d$, which is mounted upon shaft $e$, having bearings upon the framework $c$ and having a pinion $f$ keyed thereto, which pinion meshes with and drives a gear $h$, mounted upon end of the roll $a$. The friction-pulley may be of any of the well-known varieties, and I have shown one in which the friction mechanism is operated by the opening and closing of two jaws or levers $g$, controlled by the sliding cone $i$ on shaft $e$, as is readily understood. In Figs. 1 and 2 is shown a device for moving the said cone $i$, and thus throwing the friction-clutch into or out of action, which consists of a lever $k$, pivoted upon a bracket $o$ upon the frame and having one end $k'$ forked to span and receive the said cone $i$. The other end of the lever $k$ has a segmental gear $m$ thereon, which gear meshes with and is moved by a pinion $n$, which in turn is operated by means of a hand-wheel $p$ upon its shaft $r$. A common clutch is often used on this shaft $e$ instead of the pulley $d$ for a belt. All of this mechanism is well known, and as it forms no part of my invention will not be described further.

It not infrequently happens that the operators of these machines have their fingers or some loose part of their clothing caught in the rollers, and thus the hand or arm is drawn into and mangled by the rollers. Now the operator is usually so far from the ordinary shipping mechanism that caught as he is he cannot by the usual means stop the machine in time to avoid being drawn into the rollers, and the purpose of my invention is to provide suitable means whereby the operator, immediately upon perceiving that his fingers or garments are caught, can instantly throw the driving mechanism out of action. Indeed the device might often prevent the operator being thus caught, as, for instance, in case he should accidentally fall upon the machine the mechanism is so located that the instinctive putting out of his hands to break his fall would cause the device to be operated.

Across the top of the machine and in such a position as to be readily accessible to the operator at all times and yet not interfere with the legitimate uses of the machine are located two levers or rocking arms $s$ and $t$, pivoted at $s'$ and $t'$, respectively, to some fixed part of the machine. As shown, they are pivoted to the "gages" $c'$, which are secured to the frame $c$. These two arms meet in the center of the machine and are hinged together loosely at the point of meeting $u$, this joint $u$ being sufficiently loose to allow the arms to swing upon the pivots or studs $s'$ and $t'$. One arm pivoted at $t'$ and extending entirely across the machine might be employed in place of the two, but is not so desirable, owing to the greater distance through which its outer end would move. The arm $t$ has springing from its hub $t^2$ a hook $t^3$, which, when the arms are in the position shown in Fig. 1, engages a lug $w'$ upon a sleeve $w$, which is slidably mounted upon a bar or slide $y$, secured in any desired manner to the fixed parts of the machine. The slide $y$ is for carrying the sleeve $w$ and controlling the freed end of the chain 2 when it is suddenly released by the movement of arms $s$ and $t$. As shown, one end of slide $y$ is secured to the stud $t'$ and the other is secured to or rests upon the bracket $c^2$, secured to the framework. This bracket $c^2$ has a stud $c^3$, upon which is mounted a sheave 1, over which a chain 2 passes, one end of said chain being secured to the sleeve $w$ on slide $y$ and the other end bearing a weight 3. Connected to chain 2, just above the weight 3, is a second chain 4, which passes over a sheave 5, mounted upon the frame, and is secured to the shipping-lever $k$.

Normally the parts remain in the relative positions shown, with the weight 3 supported by the chain 2, sleeve $w$, and hook $t^3$, the chain 4 being loose and of a length sufficient to allow the usual movements of the shipping-lever.

It is obvious that if arms $s$ and $t$ be swung backward, either intentionally or accidentally, the hook $t^3$ would free itself from lug $w'$ and release the sleeve $w$, when the weight 3 would drop, bringing a tension on chain 4 and drawing the shipping-lever $k$ over to the left, Fig. 1, and thus throw the clutch out of action and stop the machine.

It is obvious that chain 2 may be hooked direct to the detent end of arm or hook $t^3$ instead of to sleeve $w$, but I prefer the method first described.

Fig. 5 shows the chain 4 as passing over another sheave, 6, to a shipping-lever $k$. The operation and application of this second arrangement are too apparent to need explanation.

This invention may be applied to any machine of the general style here shown or to other styles of machines in a variety of ways which will occur to any one familiar with this class of machinery.

Many modifications might be made in the means for catching up and supporting the chain 2 without departing from the spirit of the invention, provided the rocking arms $s$ and $t$ or some substantial equivalent is used to release the said catch. A spring might be used in place of weight 3.

Having thus described my invention, what I claim is—

1. In a safety stop device as herein described the combination of the rocking arms $s$ and $t$, hook $t^3$, lug $w'$, sleeve $w$, guide $y$, weight 3, chains 2 and 4, shipping-lever $k$ for the purpose of releasing the power as herein set forth.

2. In a safety stop device substantially as described, the combination of the lever $k$, sheaves 1 and 5, weight 3, sleeve $w$, guide $y$, detent $w'$, hook $t^3$ with the releasing-levers $s$ and $t$, the movement of which releases the weight 3 for the purpose herein set forth.

3. In a stop mechanism for machines as herein described, weight-releasing arms $s$ and $t$ in combination with the hook $t^3$, detent $w'$ chains 2 and 4, weight 3, lever $k$ substantially as and for the purpose set forth.

4. In a stop mechanism the combination of the releasing-levers $s$ and $t$, hook $t^3$, chains 2 and 4 sheaves 1 and 5, lever $k$ for the purpose set forth.

JAMES BENNETT FORSYTH.

Witnesses:
CHARLES CARR,
F. M. HOOPER.